US010437203B2

(12) United States Patent
Laflen et al.

(10) Patent No.: US 10,437,203 B2
(45) Date of Patent: Oct. 8, 2019

(54) METHODS AND SYSTEMS FOR DYNAMIC WORKFLOW PRIORITIZATION AND TASKING

(71) Applicant: General Electric Company, Schenectady, NY (US)

(72) Inventors: John Brandon Laflen, Niskayuna, NY (US); Anand Uday, Ann Arbor, MI (US); Piyush Modi, San Ramon, CA (US); Joe William Bolinger, Dublin, CA (US); LynnAnn DeRose, Gloversville, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1058 days.

(21) Appl. No.: 14/048,934

(22) Filed: Oct. 8, 2013

(65) Prior Publication Data

US 2015/0100138 A1    Apr. 9, 2015

(51) Int. Cl.
*G05B 13/04*    (2006.01)
*H04Q 9/00*    (2006.01)

(52) U.S. Cl.
CPC ............... *G05B 13/04* (2013.01); *H04Q 9/00* (2013.01); *H04Q 2209/20* (2013.01); *H04Q 2209/40* (2013.01); *H04Q 2209/50* (2013.01)

(58) Field of Classification Search
CPC ...... G05B 13/04; H04Q 9/00; H04Q 2209/40; H04Q 2209/20; H04Q 2209/50
See application file for complete search history.

(56) References Cited

U.S. PATENT DOCUMENTS 7,557,702 B2 * 7/2009 Eryurek ............... G05B 23/027
                                                                       340/3.1
7,606,671 B2   10/2009 Walker
(Continued)

FOREIGN PATENT DOCUMENTS

CN    103099641 A    5/2013
JP    2013-27497 A    2/2013
(Continued)

OTHER PUBLICATIONS

Janz et al., "Information Systems and Health Care II: Back to the Future With RFID: Lessons Learned—Some Old, Some New", Communications of the Association for Information Systems, vol. No. 15, pp. 132-148, Jan. 28, 2005.
(Continued)

*Primary Examiner* — Charles R Kasenge
(74) *Attorney, Agent, or Firm* — Fletcher Yoder, P.C.

(57) ABSTRACT

A computer-implemented system includes a plurality of metrological interface devices. Each metrological interface device is in communication with a metrological sensing device configured to detect metrological data from a physical asset. The computer-implemented system also includes a portable computing device. The portable computing device is configured to a) receive a metrological data set, the metrological data set substantially representing data associated with the physical asset at a point in time, b) process the metrological data set and an asset data model into a processed metrological data set, c) upon determining, based on the processed metrological data set, a metrological variance, recalibrating the asset data model and returning to step (a), and d) upon determining no metrological variance, reporting the metrological data set and the asset data model to at least one report recipient.

19 Claims, 10 Drawing Sheets

(56) References Cited

U.S. PATENT DOCUMENTS

| | | | |
|---|---|---|---|
| 7,886,453 B2 | 2/2011 | Ould et al. | |
| 7,900,369 B2 | 3/2011 | Albrecht | |
| 7,913,411 B2 | 3/2011 | Klepp | |
| 7,971,487 B2 | 7/2011 | Carlen et al. | |
| 7,992,315 B2 | 8/2011 | Nonni et al. | |
| 7,992,317 B1 | 8/2011 | Cannata | |
| 7,997,001 B1 | 8/2011 | Mekid | |
| 8,037,616 B2 | 10/2011 | Stockman | |
| 8,185,217 B2* | 5/2012 | Thiele | G05B 13/042 700/29 |
| 8,296,965 B2 | 10/2012 | Stockman et al. | |
| 8,744,822 B2* | 6/2014 | Mewes | G06F 17/5009 703/6 |
| 8,768,667 B2* | 7/2014 | Lindores | G06F 17/30241 703/6 |
| 8,855,937 B2* | 10/2014 | Lindores | A01B 79/005 702/19 |
| 8,880,203 B2* | 11/2014 | Wojsznis | G05B 23/024 700/103 |
| 9,058,633 B2* | 6/2015 | Lindores | G06Q 10/06 |
| 9,213,905 B2* | 12/2015 | Lange | G06K 9/00805 |
| 2003/0176183 A1 | 9/2003 | Drucker et al. | |
| 2005/0228301 A1 | 10/2005 | Banet et al. | |
| 2006/0162178 A1 | 7/2006 | Freidin | |
| 2007/0067678 A1 | 3/2007 | Hosek et al. | |
| 2007/0106179 A1 | 5/2007 | Bagha et al. | |
| 2007/0167678 A1 | 7/2007 | Moskowitz et al. | |
| 2007/0232907 A1 | 10/2007 | Pelissier et al. | |
| 2007/0255114 A1 | 11/2007 | Ackermann et al. | |
| 2008/0097912 A1 | 4/2008 | Dicks et al. | |
| 2008/0120080 A1* | 5/2008 | Nasle | G05B 17/02 703/13 |
| 2008/0177155 A1 | 7/2008 | Hansen et al. | |
| 2008/0189393 A1* | 8/2008 | Wagner | H04L 29/12509 709/218 |
| 2008/0208487 A1* | 8/2008 | Goebel | G06Q 10/04 702/34 |
| 2008/0215302 A1* | 9/2008 | Nasle | G06F 17/5009 703/13 |
| 2008/0228057 A1 | 9/2008 | Graskov et al. | |
| 2008/0262820 A1* | 10/2008 | Nasle | G06Q 10/04 703/18 |
| 2008/0263469 A1* | 10/2008 | Nasle | G06F 8/38 715/771 |
| 2008/0306798 A1* | 12/2008 | Anke | G06F 8/61 705/7.26 |
| 2009/0063122 A1* | 3/2009 | Nasle | G05B 23/0235 703/18 |
| 2009/0076749 A1* | 3/2009 | Nasle | G05B 17/02 702/62 |
| 2009/0083019 A1* | 3/2009 | Nasle | G06F 17/509 703/18 |
| 2009/0099832 A1* | 4/2009 | Nasle | G06F 17/5009 703/18 |
| 2009/0113049 A1* | 4/2009 | Nasle | G05B 13/026 709/224 |
| 2009/0149972 A1* | 6/2009 | Nasle | G05B 17/02 700/80 |
| 2009/0195776 A1 | 8/2009 | Durst et al. | |
| 2009/0198350 A1* | 8/2009 | Thiele | G05B 13/042 700/30 |
| 2010/0047745 A1 | 2/2010 | Bergqwist et al. | |
| 2010/0168931 A1* | 7/2010 | Nasle | G05B 17/02 700/291 |
| 2010/0198032 A1 | 8/2010 | Simpson et al. | |
| 2010/0222648 A1 | 9/2010 | Tan | |
| 2010/0288016 A1 | 11/2010 | Basar | |
| 2010/0324936 A1 | 12/2010 | Vishnubhatla et al. | |
| 2011/0166824 A1 | 7/2011 | Haisty et al. | |
| 2011/0231127 A1 | 9/2011 | Dirienzo et al. | |
| 2011/0288660 A1* | 11/2011 | Wojsznis | G05B 23/024 700/30 |
| 2011/0313257 A1 | 12/2011 | Abraham-Fuchs et al. | |
| 2011/0314685 A1 | 12/2011 | Dalla Casa | |
| 2012/0095315 A1 | 4/2012 | Tenbarge et al. | |
| 2012/0101796 A1* | 4/2012 | Lindores | G06F 17/30241 703/9 |
| 2012/0101861 A1* | 4/2012 | Lindores | G06Q 10/06 705/7.11 |
| 2012/0101934 A1* | 4/2012 | Lindores | G06Q 10/06 705/37 |
| 2012/0109614 A1* | 5/2012 | Lindores | A01B 79/005 703/11 |
| 2012/0123981 A1* | 5/2012 | Graves | G06F 17/30339 706/13 |
| 2012/0157802 A1 | 6/2012 | Chou | |
| 2012/0191440 A1* | 7/2012 | Meagher | H02J 3/38 703/18 |
| 2012/0237083 A1* | 9/2012 | Lange | G06K 9/00805 382/103 |
| 2013/0006570 A1 | 1/2013 | Kaplan | |
| 2013/0006675 A1 | 1/2013 | Bowne et al. | |
| 2013/0246858 A1 | 9/2013 | Ceglia et al. | |
| 2013/0278414 A1* | 10/2013 | Sprigg | G08B 21/0453 340/539.12 |
| 2013/0339353 A1* | 12/2013 | Emmelmann | H04W 16/14 707/736 |
| 2014/0031786 A1* | 1/2014 | Kircher, Jr. | A61B 5/14532 604/504 |
| 2014/0122045 A1* | 5/2014 | Mewes | G06F 17/5009 703/6 |
| 2014/0310701 A1* | 10/2014 | Chylinski | G06F 8/65 717/173 |

FOREIGN PATENT DOCUMENTS

| | | |
|---|---|---|
| WO | 2000041613 A2 | 7/2000 |
| WO | 2002008922 A1 | 1/2002 |
| WO | 2002071933 A2 | 9/2002 |
| WO | 2005084753 A1 | 9/2005 |
| WO | 2010142447 A1 | 12/2010 |
| WO | 2011042286 A1 | 4/2011 |
| WO | 2011139786 A2 | 11/2011 |

OTHER PUBLICATIONS

Daudelin, et al., "Using Specialized Information Technology to Reduce Errors in Emergency Cardiac Care", Advances in Patient Safety: From Research to Implementation, vol. No. 3, pp. 7-21, Feb. 2005.

Infosys, "KPIs for Effective, Real-Time Dashboards in Hospitals", pp. 7, Mar. 2009.

Savi, "Savi Mobile Tracking System", Savi Technology, 2012.

European Search Report and Opinion issued in connection with corresponding EP Application No. 14187291.1 dated Apr. 2, 2015.

Machine Translation and First Office Action and Search issued in connection with corresponding CN Application No. 201410525151.9 dated Jan. 9, 2019.

* cited by examiner

METHODS AND SYSTEMS FOR DYNAMIC WORKFLOW PRIORITIZATION AND TASKING

BACKGROUND

The field of the disclosure relates generally to an apparatus, computer-implemented system, and computer-implemented method used to use a universal wireless platform for asset monitoring to facilitate dynamic workflow prioritization and tasking.

Many known physical assets and physical systems require asset monitoring. Asset monitoring may involve the determination of asset status by identifying asset data including, for example, physical measurements related to assets or asset components, physical location or orientation of assets, and the presence or physical availability of assets. Reliable asset data may be obtained using metrological inspection. As used herein, "metrological inspection" refers to the use of devices or tools to obtain asset data and, in particular, physical measurements. Asset data may describe physical measurements including, for example and without limitation, distance, volume, pressure, and velocity. Alternatively, asset data may describe asset characteristics which require analysis or extrapolation to determine physical measurements. For example, asset data may be optical data which includes a plurality of geographic coordinates in reference to an asset. The optical data may not be immediately discernible as useful physical measurements but computation and extrapolation may yield physical measurements. Metrological inspection may involve the use of metrological inspection devices. Metrological inspection devices may include any device capable of facilitating metrological inspection including, for example, gauges, sensors, and calipers. Some known metrological inspection devices may include computing devices capable of displaying asset data to a user display (e.g., a liquid-crystal display) and storing asset data to a memory device. Some computing devices included with metrological inspection devices may additionally be able to transmit asset data to other computing devices. The computing devices that are capable of transmitting asset data to other computing devices may utilize a variety of communication protocols to transmit asset data.

Many known physical systems and physical assets are monitored and inspected through taking a large plurality of asset data readings. Such monitoring and inspection may be time consuming. Additionally, suitable monitoring and inspection of such physical systems may require computational capabilities which are not immediately available to field inspectors.

BRIEF DESCRIPTION

In one aspect, a computer-implemented system is provided. The computer-implemented system includes a plurality of metrological interface devices. Each metrological interface device includes a printed circuit board (PCB), also referred to as a circuit card assembly (CCA), including at least one metrological sensor communication interface, and at least one first wireless communication interface. Each metrological interface device is in communication with a metrological sensing device via the metrological sensor communication interface. Each metrological sensing device is configured to detect metrological data from a physical asset. Each metrological interface device is configured to receive the metrological data from the metrological sensing device. The computer-implemented system also includes a portable computing device. The portable computing device includes a memory device, a processor coupled to the memory device, and further includes a second wireless communication interface coupled to the memory device and to the processor. The second wireless communication interface is configured to communicate with the metrological interface devices via the first wireless communication interface. The portable computing device is configured to a) receive a metrological data set, the metrological data set substantially representing data associated with the physical asset at a point in time, b) process, by the processor, the metrological data set and an asset data model into a processed metrological data set, the asset data model substantially representing a model of the physical asset associated with the metrological sensing device and further associated with the metrological interface device, c) upon determining, based on the processed metrological data set, a metrological variance, recalibrating the asset data model and returning to step (a), and d) upon determining no metrological variance, reporting the metrological data set and the asset data model to at least one report recipient.

In a further aspect, a computer-based method is provided. The computer-based method is performed by a portable computing device. The mobile computing device includes a memory device, a processor coupled to the memory device, and further including a second wireless communication interface coupled to the memory device and to the processor. The second wireless communication interface is configured to communicate with a plurality of metrological interface devices. The plurality of metrological interface devices is in communication with a plurality of metrological sensing devices. The metrological sensing devices are configured to detect metrological data from a physical asset. The method includes a) receiving a metrological data set, the metrological data set substantially representing data associated with the physical asset at a point in time, b) processing the metrological data set and an asset data model into a processed metrological data set, the asset data model substantially representing a model of the physical asset associated with the metrological sensing device and further associated with the metrological interface device, c) upon determining, based on the processed metrological data set, a metrological variance, recalibrating the asset data model and returning to step (a), and d) upon determining no metrological variance, reporting the metrological data set and the asset data model to at least one report recipient.

In another aspect, a computer-readable storage device is provided. The computer-readable storage device has processor-executable instructions embodied thereon. The computer-readable storage device includes instructions that may be read by a portable computing device. The portable computing device includes at least one processor and a memory device coupled to the processor. The portable computing device further includes a second wireless communication interface coupled to the memory device and to the processor. The second wireless communication interface is configured to communicate with a plurality of metrological interface devices. The plurality of metrological interface devices is in communication with a plurality of metrological sensing devices. The metrological sensing devices are configured to detect metrological data from a physical asset. The processor-executable instructions cause the portable computing device to a) receive a metrological data set, the metrological data set substantially representing data associated with the physical asset at a point in time, b) process, by the processor, the metrological data set and an asset data model into a processed metrological data set, the asset data model substantially representing a model of the physical asset associated with the metrological sensing device and further associated with the metrological interface device, c) upon determining, based on the processed metrological data set, a metrological variance, recalibrate the asset data model and returning to step (a), and d) upon determining no metrological variance, report the metrological data set and the asset data model to at least one report recipient.

DRAWINGS

These and other features, aspects, and advantages will become better understood when the following detailed description is read with reference to the accompanying drawings in which like characters represent like parts throughout the drawings, wherein.

Figure 1A:
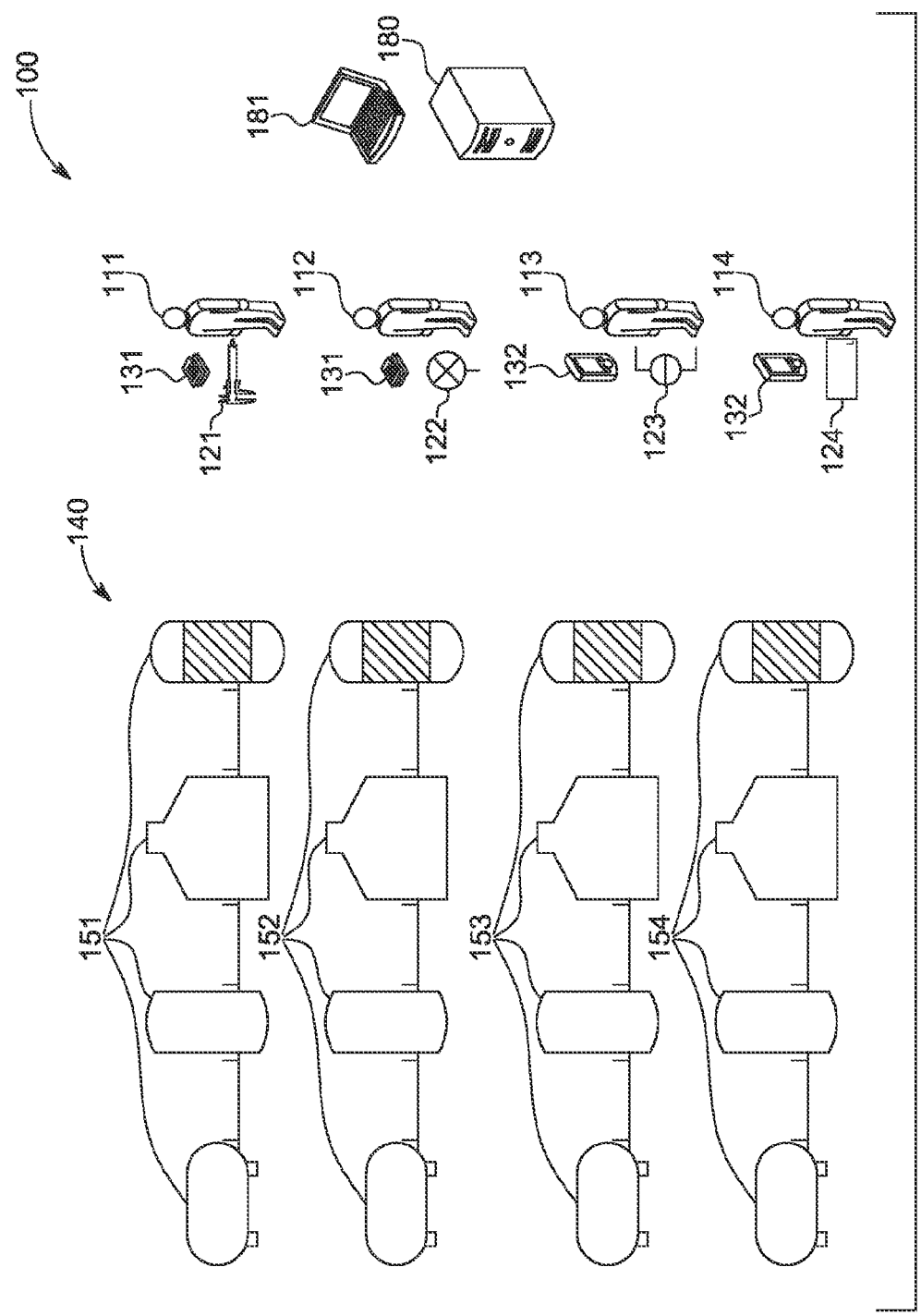
FIG. 1A is an illustration of an environment containing physical assets being monitored by field inspectors without using metrological sensing devices and further without using the universal wireless platform described in the present disclosure.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "asset data" and related terms refers to any data related to at least one physical state of at least physical asset. Asset data may include, without limitation, physical measurements of distance, physical measurements of volume, physical measurements of pressure, physical measurements of temperature, location information, physical measurements of electrical current, and any other physical measurements which may be detected using a metrological sensing device. Asset data containing physical measurements may be referred to as "primary asset data." Alternately, asset data may include, without limitation, "secondary asset data" which may be used to determine physical measurements. For example, optical data produced by a borescope may present as a series of three-dimensional coordinates which can be processed to determine the physical characteristics of an asset. However, such optical data may not represent "primary asset data" within the meaning above unless such processing occurs. As used herein, this form of secondary asset data used to create physical measurements may be used interchangeably with primary asset data containing physical measurements, unless otherwise noted.

As used herein, the term "metrological sensing device" and related terms refers to tools, device, and other apparatus capable of measuring or otherwise determining asset data.

Although metrological sensing devices may be manual or electronic, the metrological sensing devices used in conjunction with the systems and methods described herein are capable of transmitting asset data to a computing device. In some examples, metrological sensing devices may include a display, a processor, and a memory device. Additionally, metrological sensing devices may produce analog data and digital data. In at least some examples, metrological sensing devices may produce complex data which requires computation to decode into physical measurement data (or primary asset data, as described above).

As used herein, the terms "software" and "firmware" are interchangeable, and include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The computer-implemented systems and methods described herein facilitate the creation of a universal wireless platform for asset monitoring which may be used in the monitoring of physical assets and physical systems. The systems and methods provide the universal wireless platform by providing a standard interface from metrological sensing devices to computing devices including mobile computing devices. The standard interface allows a variety of metrological sensing devices to transmit asset data to computing devices and thereby facilitates processing asset data efficiently. Specifically, by standardizing this communication, the universal wireless platform allows a significant reduction in the resources and investment required to monitor and inspect physical assets. Additionally, this platform resultantly effects rapid condition monitoring and inspection of physical assets.

The computer-implemented systems and methods described herein further facilitate dynamic workflow processing in the collection, review, and processing of asset data. Using the universal wireless platform, the systems and methods facilitate responsive asset data collection to capture asset data relevant to determining a data model of the physical state of at least one asset. The systems and methods also facilitate cloud-based processing and determinations of a new data model of the physical state of the at least one asset. The new data models and collected asset data can further be transmitted locally and across a network to other computing devices to determine potential reactive steps including further diagnosis, maintenance, and repair of physical assets.

FIG. 1A is an illustration of an example environment 100 containing physical assets 140 being monitored by field inspectors 111, 112, 113, and 114 without using metrological sensing devices (not shown in FIG. 1A) and accordingly without using the universal wireless platform described in the present disclosure. Environment 100 is an example illustration showing the complexities of monitoring and inspecting physical assets 140. In the exemplary embodiment, environment 100 is a chemical processing facility containing physical assets 140 used to process industrial chemicals. Although environment 100 includes four rows of physical assets 151, 152, 153, and 154 used in the chemical processing facility, the systems and methods described herein may be applied to any environment 100 containing any number or variety of physical assets 140 including, without limitation, industrial environments, power generation and distribution environments, manufacturing environments, biotechnology environments, commercial sales environments, commercial distribution environments, transportation environments, residential environments, and agricultural environments.

Environment 100 includes a plurality of field inspectors 111, 112, 113, and 114 monitoring physical assets 140. Field inspectors 111, 112, 113, and 114 use a plurality of measurement devices 121, 122, 123, and 124 to take physical measurements and obtain asset data (i.e., primary asset data) from physical assets 140. More specifically, the field inspector is using a particular tool. For example, field inspector 111 is using caliper 121 to measure widths of cracks in physical asset row 151. Field inspector 112 is using a pressure gauge to measure pressure levels of vessels in physical asset row 152. Field inspector 113 is using level gauge 123 to determine the level of fluids in vessels of physical asset row 153. Field inspector 114 is using temperature gauge 124 to measure the temperature of vessels of physical row 154. Because the field inspector is only obtaining a specific type of measurements, they each need to take measurements from all four physical asset rows 151, 152, 153, and 154. Although each field inspector could have more measurement devices, each asset measurement must be taken manually.

Field inspectors 111, 112, 113, and 114 further record asset data. Field inspectors 111 and 112 manually record asset data into paper records 131 while field inspectors 113 and 114 electronically record asset data into mobile computing devices 132. However, once all asset data has been recorded, the asset data still has to be consolidated to properly monitor environment 100. Asset data is consolidated on monitoring server 180. Each field inspector 111, 112, 113, and 114 must provide asset data recorded in paper records 131 or mobile computing devices 132. Field inspectors 111 and 112 may use a recording computing device 181 to enter asset data into a record. Field inspectors 113 and 114 may use recording computing device 181 to enter asset data or alternately use mobile computing devices 132 to directly transmit asset data to monitoring server 180. Recording computing device 181 may transmit asset data to monitoring server 180.

As is shown, the process of obtaining asset data, recording asset data, and consolidating asset data may be very time consuming for field inspectors 111, 112, 113, and 114. As described below, using metrological sensing devices and further using the universal wireless platform described herein can expedite the process of the monitoring of physical assets 140.

Figure 1B:
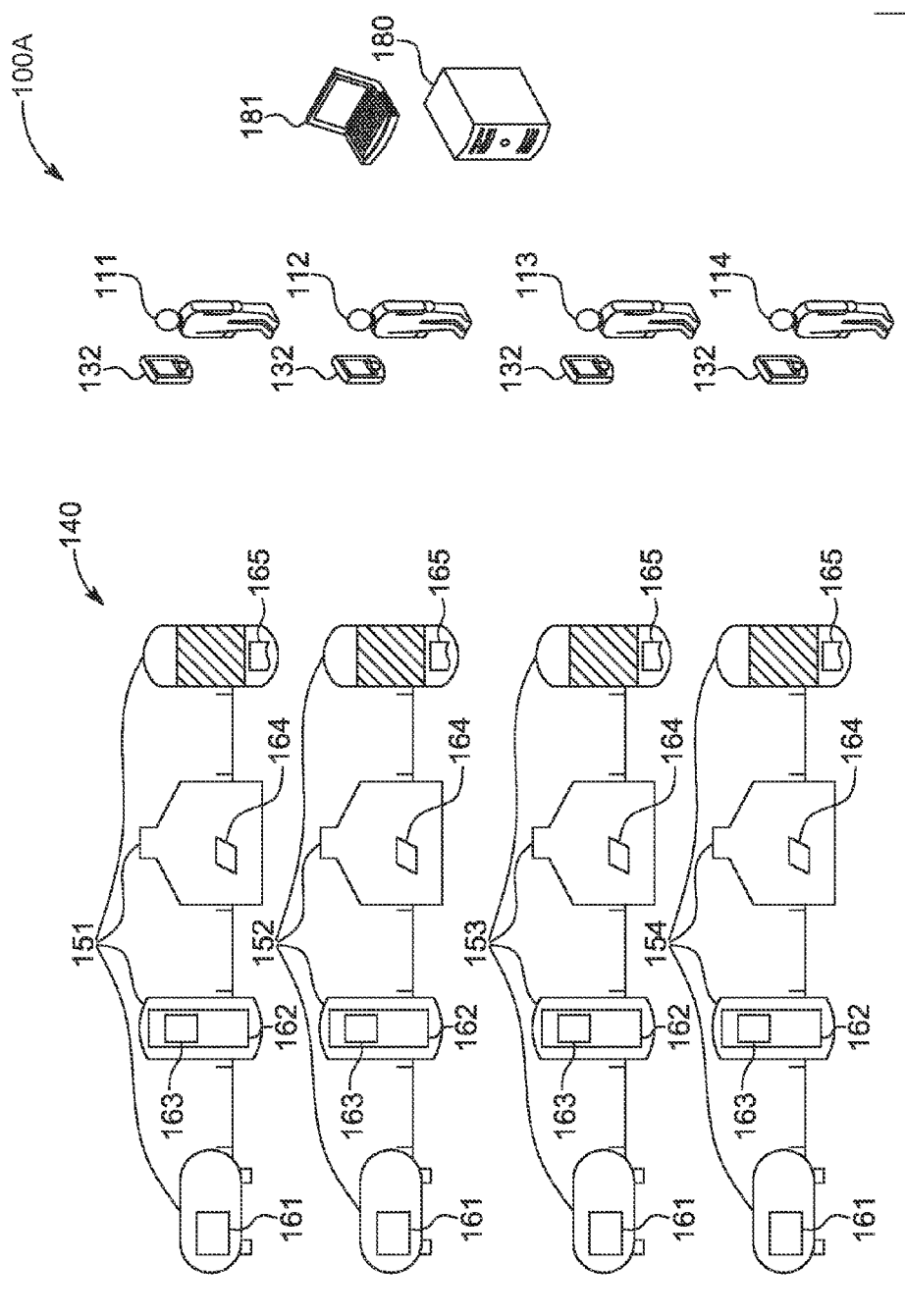
FIG. 1B is an illustration of an environment containing physical assets being monitored by field inspectors using metrological sensing devices but without using the universal wireless platform described in the present disclosure.

FIG. 1B is an illustration of an example environment 100A containing physical assets 140 being monitored by field inspectors 111, 112, 113, and 114 using metrological sensing devices 161, 163, 164, and 165 but without using the universal wireless platform described in the present disclosure. As in FIG. 1A, environment 100A is a chemical processing facility containing physical assets 140 used to process industrial chemicals. In environment 100A, field inspectors 111, 112, 113, and 114 utilize mobile computing devices 132 to record asset data. Additionally, unlike in FIG. 1A, physical assets 140 have at least one of metrological sensing devices 161, 163, 164, and 165 physically attached to each asset of physical assets 140.

Although in environment 100A, metrological sensing devices 161, 163, 164, and 165 are physically coupled to a physical asset of physical assets 140, not all metrological sensing devices 161, 163, 164, and 165 may be physically coupled to physical assets 140. Depending on at least the size, portability, cost and scarcity of each metrological sensing devices 161, 163, 164, and 165, metrological sensing devices 161, 163, 164, and 165 may be removable and/or portable from physical assets 140.

Metrological sensing devices 161, 163, 164, and 165 are configured to obtain at least one kind of asset data. For example metrological sensing device 161 is sensing device configured to take measurements equivalent to a caliper. Metrological sensing device 163 is configured to take pressure measurements. Metrological sensing device 163 is physically contained within housing 162. Metrological sensing device 164 is configured to take fluid level measurements. Metrological sensing device 165 is configured to take temperature readings. Alternately, metrological sensing devices 161, 163, 164, and 165 may obtain any kind of asset data as described above. More specifically, caliper measurements, pressure measurements, fluid level measurements, and temperature readings may be described as primary data as each is a form of asset data including physical measurements. In contrast, metrological sensing devices 161, 163, 164, and 165 may alternately collect secondary data which may be processed into primary data.

In some embodiments, metrological sensing devices 161, 163, 164, and 165 include output interfaces allowing each metrological sensing device to transmit asset data to at least some computing devices. Metrological sensing devices 161, 163, 164, and 165 may use a variety of communications protocols to transmit asset data via their respective output interfaces including, for example, universal serial bus ("USB"), recommended standard 232 ("RS232"), serial peripheral interface bus ("SPI"), inter-integrated circuit ("I2C"), analog, and proprietary I/O interfaces. Dozens of proprietary I/O interfaces exist which require specific methods of interaction to obtain asset data. Accordingly, mobile computing device 132 may send and receive data from and to metrological sensing devices 161, 163, 164, and 165 if mobile computing device 132 and metrological sensing devices 161, 163, 164, and 165 support the same communications protocols. Accordingly, although mobile computing device 132 may be capable of receiving data using at least some of these communications standards, some standards may not be supported by a particular mobile computing device 132. In the exemplary embodiment, metrological sensing device 161 uses a USB input/output interface, metrological sensing device 163 uses a RS232 input/output interface, metrological sensing device 164 uses a first proprietary input/output interface, and metrological sensing device 165 uses a second input/output interface. In the exemplary embodiment, mobile computing device 132 supports USB and I2C. Accordingly, field inspectors 111, 112, 113, and 114 can only receive digital output from metrological sensing device 161. All other asset data from metrological sensing devices 163, 164, and 165 require manual input into mobile computing devices 132.

Metrological sensing devices 161, 163, 164, and 165 allows field inspectors 111, 112, 113, and 114 to monitor and inspect physical assets 140 more efficiently than in environment 100 but there are still limitations which prevent efficient capture and processing of asset data. As described above, the variety of communications standards employed by metrological sensing devices 161, 163, 164, and 165 may force each field inspector 111, 112, 113, and 114 to manually input asset data for at least some metrological sensing devices 161, 163, 164, and 165. Additionally, where metrological sensing devices 161, 163, 164, and 165 use communications standards supported by mobile computing device 132, each field inspector must physically connect to any metrological sensing device 161, 163, 164, and 165 which does not support a wireless communication protocol. Such connection may require additional equipment (e.g., wires or cables) and take additional time. Also, field inspectors 111, 112, 113, and 114 must consolidate the asset data obtained at monitoring server 180 as in FIG. 1A.

Figure 1C:
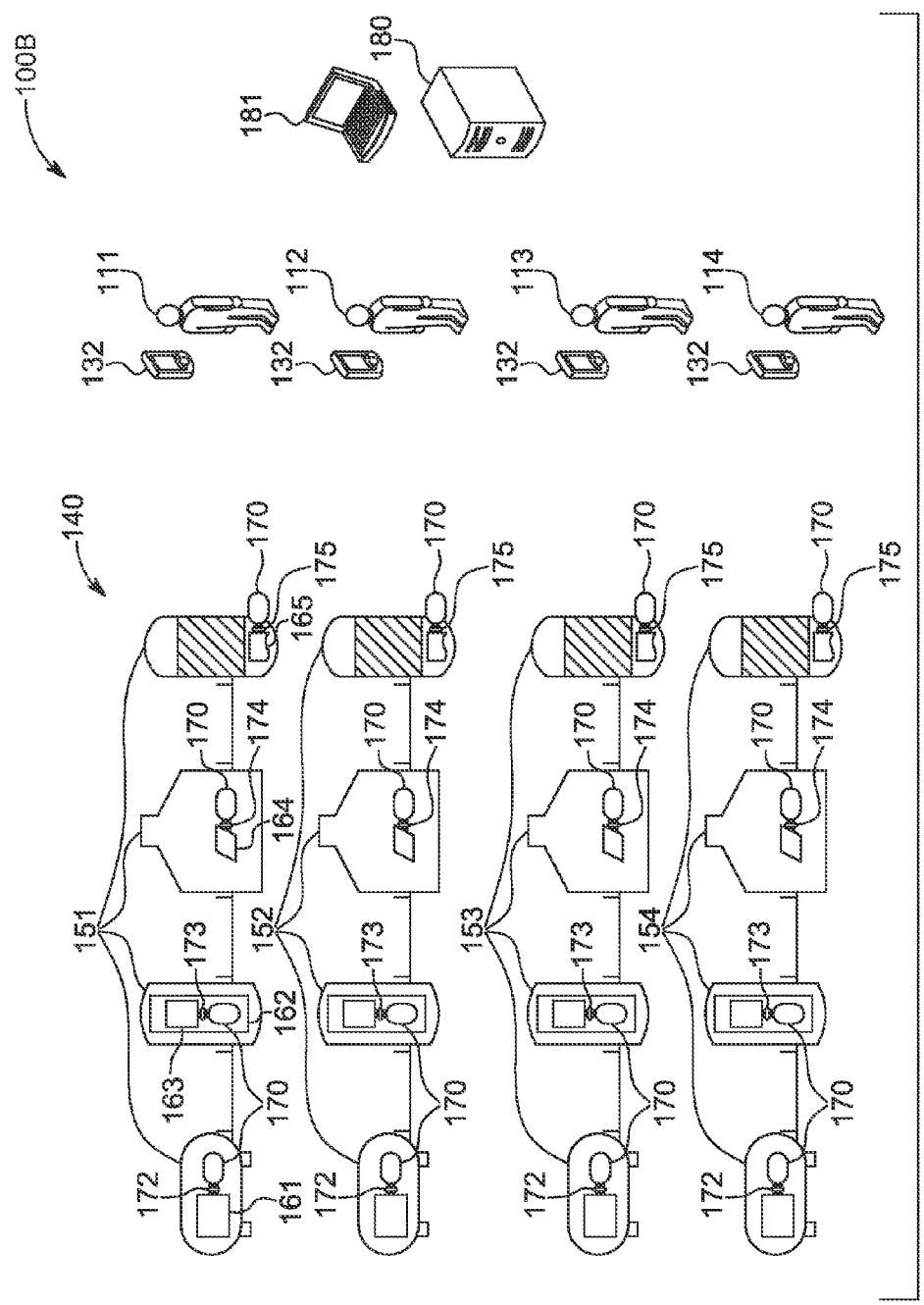
FIG. 1C is an illustration of an environment containing physical assets being monitored by field inspectors using metrological sensing devices and using a universal wireless platform.

FIG. 1C is an illustration of an example environment 100B containing physical assets 140 being monitored by field inspectors 111, 112, 113, and 114 using metrological sensing devices 161, 163, 164, and 165 and using a universal wireless platform. In environment 100B, each metrological sensing device is coupled to a metrological interface device 170. In the exemplary embodiment, metrological interface device 170 represents a printed circuit board ("PCB") capable of receiving asset data using a plurality of communication protocols including USB, RS232, I2C, SPI, analog, and proprietary I/O protocols.

Communication to each metrological sensing device using each respective communication protocol requires interface links 172, 173, 174, and 175. Interface link 172 allows metrological interface device 170 to communicate with metrological sensing device 161 using a USB protocol. Interface link 173 allows metrological interface device 170 to communicate with metrological sensing device 163 using a RS232 protocol. Interface link 174 allows metrological interface device 170 to communicate with metrological sensing device 164 using a first proprietary input/output protocol. Interface link 175 allows metrological interface device 170 to communicate with metrological sensing device 165 using a second proprietary input/output protocol.

In one example, metrological interface device 170 is coupled externally to a metrological sensing device (e.g., metrological sensing device 161). In this example, metrological interface device 170 may include a chassis to contain metrological interface device. The chassis may be made of any material including, for example, metal, plastic, a metal alloy, or any other material suitable for containing the PCB and facilitating interaction between metrological interface device 170 and a metrological sensing device.

In a second example, metrological interface device 170 is contained within a chassis containing both a metrological interface device and a metrological sensing device (e.g., housing 162 containing metrological sensing device 163 and metrological interface device 170.)

Metrological interface device 170 is further configured to communicate with mobile computing device 132. In the exemplary embodiment, metrological interface device 170 uses Bluetooth® Low Energy ("BLE") protocol to communicate with mobile computing device 132. BLE is also known as Bluetooth SMART®. (Bluetooth and Bluetooth SMART are registered trademarks of Bluetooth Special Interest Group of Kirkland, Wash.) BLE is an advantageous protocol for metrological interface device 170 to use in generating the universal wireless platform because it consumes relatively low power while maintaining communication ranges associated with Bluetooth. Given the size of at least some environments 100B monitored by field inspectors 111, 112, 113, and 114, greater ranges of communication may enable efficient field inspections. Additionally, BLE is a commonly supported wireless protocol for a variety of mobile computing devices 132. Using metrological interface device 170 to allow asset data received by metrological sensing devices 161, 163, 164, and 165 to be received by mobile computing device 132 substantially represents creating a universal wireless platform. Accordingly, metrological interface device 170 substantially facilitates the creation and use of the universal wireless platform to facilitate inspection and monitoring of physical assets 140.

In alternative embodiments, metrological interface device 170 can use additional wireless protocols including, for example 802.11b, Bluetooth, and ZigBee®. (ZigBee is a registered trademark of the ZigBee Alliance of San Ramon, Calif.) Alternately, any other suitable wireless protocol may be used. In additional embodiments, metrological interface device 170 can also provide wired communication using protocols including, without limitation, USB, RS232, I2C, SPI, analog, and proprietary I/O protocols.

Environment 100B allows field inspectors 111, 112, 113, and 114 to obtain asset data in a more efficient manner than illustrated in environments 100 or 100A. For example, each field inspector can wirelessly connect to all metrological sensing devices 161, 163, 164, and 165 by using metrological interface device 170. Metrological interface device 170 presents the availability of each metrological sensing device to a mobile computing device 132 and allow the request and transfer of asset data. By facilitating the collection of asset data, field inspectors 111, 112, 113, and 114 can further transfer asset data to monitoring server 180. In the exemplary embodiment, monitoring server 180 also receives asset data from mobile computing devices using BLE. In alternative embodiments, monitoring server 180 can receive asset data using any wireless or wired protocol including, for example and without limitation, 802.11b and ZigBee®.

In at least some examples, field inspectors 111, 112, 113, and 114 receive secondary asset data from metrological sensing devices 161, 163, 164, and 165 via at least one metrological interface device 170. As described above, secondary asset data refers to asset data which does not directly describe physical measurements associated with physical assets 140. Instead, secondary asset data may be processed to determine primary asset data which describes physical measurements associated with physical assets 140. Examples of methods of processing methods used to process secondary asset data into primary asset data include, without limitation, numerical calculations, numerical analysis, and complex modeling. Examples of categories of asset data which may require processing into primary asset data include, without limitation, chemical data wherein discrete values from chemical sensors may be processed to create a chemistry model as primary asset data, and electrical data wherein discrete electrical signals may be processed into electrical models as primary asset data.

Processing secondary asset data may require significant computational power and therefore a processor (not shown in FIG. 1C) with significant processing power. Alternately, processing secondary asset data into primary asset data may require the receipt of external data (e.g., data models or historic primary asset data) from a data source including, for example and without limitation, a memory device (not shown in FIG. 1C), a database (not shown in FIG. 1C), or a networked computing device. Accordingly, it may be efficient for secondary asset data to be processed into primary asset data by a computing device such as mobile computing device 132. Alternately, mobile computing device 132 may transfer the secondary asset data to a separate computing device (not shown in FIG. 1C) to process the secondary asset data into primary asset data and, in some examples, receive the processed primary asset data from the separate computing device. Functionally, the application of a universal wireless platform facilitated by metrological interface device 170 allows computing devices including mobile computing device 132 to function in concert with metrological sensing devices 161, 163, 164, and 165 and accordingly makes such computing devices a part of metrological sensing devices 161, 163, 164, and 165 in that the computing devices generate primary asset data regarding physical assets 140.

Figure 2:
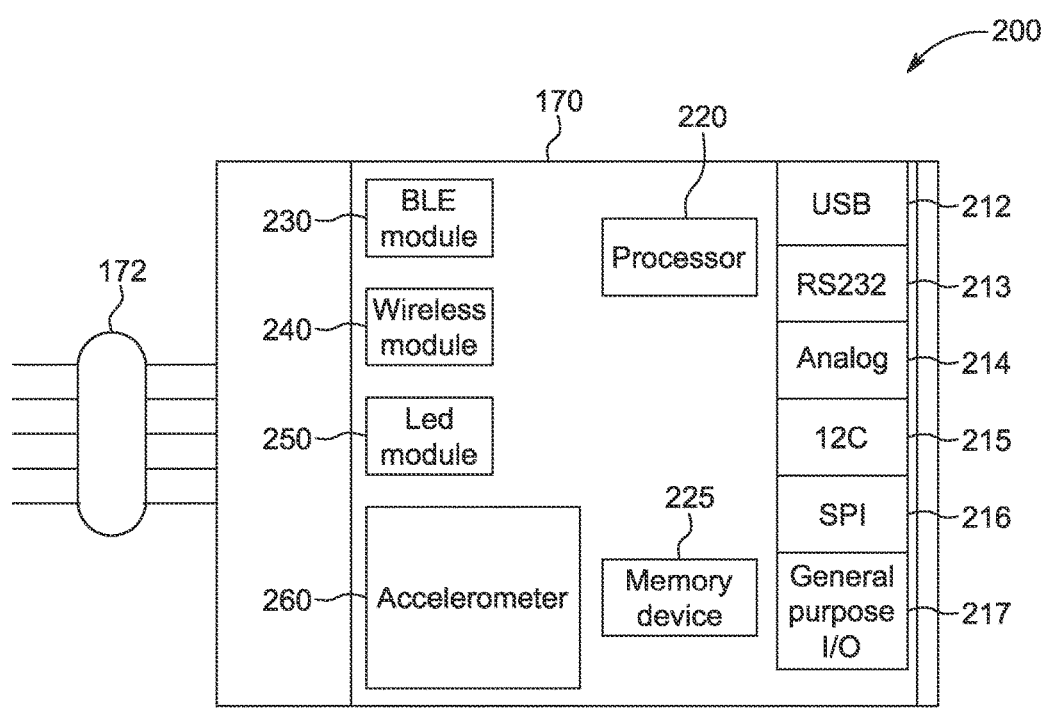
FIG. 2 is a block diagram of an exemplary metrological interface device for use in creating a universal wireless platform to facilitate the monitoring of the example environment shown in FIG. 1C.

FIG. 2 is a block diagram 200 of an exemplary metrological interface device 170 for use in creating a universal wireless platform to facilitate the monitoring of the example environment 100B (shown in FIG. 1C). Metrological interface device 170 substantially represents a printed circuit board ("PCB"). Block diagram 200 is laid out to illustrate important functional components of the PCB but block diagram 200 should not be construed to present an exhaustive illustration of all components of metrological interface device 170 or a functional layout of such components. It is noted that metrological interface device 170 may alternately be characterized as a printed circuit assembly ("PCA"). As described above, metrological interface device 170 facilitates communication between a metrological sensing device, for example, metrological sensing device 161 (shown in FIG. 1C) and mobile computing device 132 (shown in FIG. 1C).

In the exemplary embodiment, metrological interface device 170 communicates with a metrological sensing device such as metrological sensing device 161 using interface link 172. Interface link 172 allows metrological interface device 170 to communicate using a plurality of communication protocols including, without limitation, USB, RS232, I2C, SPI, analog, and proprietary I/O protocols. In the exemplary embodiment, interface link 172 connects to a metrological sensing device using SPI protocol. Metrological interface device 170 facilitates communication with metrological sensing devices by using a plurality of communications modules which allow metrological interface device 170 to receive data, including asset data including primary asset data and secondary asset data, from the metrological sensing devices such as metrological sensing device 161. The plurality of communications modules include a USB module 212, an RS232 module 213, an analog module 214, an I2C module 215, an SPI module 216, and a generic input/output module 217.

Some metrological sensing devices such as metrological sensing device 161 utilize proprietary or customized communication protocols. These communication protocols may be specific to a vendor of metrological sensing device 161 or an external standard. Generic input/output module 217 allows for interaction with such proprietary or customized communication protocols. Generic input/output module 217 may be programmed to interface with a particular communication protocol using, for example, a firmware installation or upgrade.

In the exemplary embodiment, metrological interface device 170 additionally includes a processor 220 and a memory device 225. In the exemplary embodiment, metrological interface device 170 includes a single processor 220 and a single memory device 225. In alternative embodiments, metrological interface device 170 may include a plurality of processors 220 and/or a plurality of memory devices 225. In some embodiments, executable instructions are stored in memory device 225. Metrological interface device 170 is configurable to perform one or more operations described herein by programming processor 220. For example, processor 220 may be programmed by encoding an operation as one or more executable instructions and providing the executable instructions in memory device 225. Alternately, processor 220 may be used to process secondary asset data into primary asset data.

In the exemplary embodiment, memory device 225 is one or more devices that enable storage and retrieval of information such as executable instructions and/or other data. Memory device 225 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Memory device 225 may be configured to store asset data as described above. Asset data may be stored to facilitate data backup, to provide multiple samples of asset data, and to facilitate calibration. Memory device 225 may additionally store data models and other data structures used to process asset data. In the exemplary embodiment, metrological interface device 170 is encoded with firmware which runs at processor 220. Firmware for the metrological interface device manages communication protocols, interface protocols, encryption, data formats, and power management. Firmware may be installed, upgraded, or removed using over-the-air programming or using a direct interface with a computing device such as mobile computing device 132.

Metrological interface device 170 further includes BLE module 230. BLE module 230 allows metrological interface device 170 to wirelessly communicate with computing devices, including mobile computing device 132, using the Bluetooth Low Energy® protocol. In the exemplary embodiment, metrological interface device 170 further includes wireless module 240 allowing metrological interface device 170 to wirelessly communicate with computing devices using a wireless protocol including, without limitation, 802.11b and ZigBee®.

Metrological interface device 170 also includes light-emitting diode ("LED") module 250 which can be used to facilitate displays to a user such as field inspector 111 (shown in FIG. 1B). LED module 250 can be used to indicate information related to metrological interface device 170 and connected metrological sensing device 161 including, without limitation, power availability, signal strength, connection status, and asset data readouts.

Metrological interface device 170 additionally includes accelerometer 260. Accelerometer 260 may be used to determine the frame of reference of metrological interface device 170. Frame of reference may be determined by accelerometer 260 and provided to a computing device such as mobile computing device 132. Frame of reference data may be used in conjunction with asset data to provide users such as field inspector 111 additional data regarding the physical state of an asset. Frame of reference data may also be used to process secondary asset data into primary asset data. Frame of reference data may additionally be received by a computing device such as mobile computing device 132 as asset data. Alternately, accelerometer 260 may similarly determine and provide velocity data and any other data which may be generated by an accelerometer 260.

Metrological interface device 170 additionally includes any standard components and peripherals necessary to facilitate the functions described including, without limitation, heat sinks or heat dispersal mechanisms, capacitors, transistors, and any other circuitry or components which may be required (not shown in FIG. 2).

In operation, metrological interface device 170 is configured to communicate with a metrological sensing device such as metrological sensing device 161 using interface link 172. Communications between metrological interface device 170 and metrological sensing device 161 follows a communication protocol supported by metrological sensing device 161 and is accordingly facilitated by at least one of USB module 212, RS232 module 213, analog module 214, I2C module 215, SPI module 216, and generic input/output module 217. Metrological interface device 170 can accordingly send and receive data to the metrological sensing device including asset data. Data including asset data may be stored at memory device 225.

Metrological interface device 170 also communicates with a computing device such as mobile computing device 132. Communications between metrological interface device 170 and the computing device is facilitated by at least one of BLE module 230 and wireless module 240. Processor 220 runs functions including firmware functions to manage communication protocols, process asset data from secondary asset data into primary asset data, manage interface protocols, manage encryption, manage data formats, and manage power and other resources.

In alternative embodiments, metrological interface device 170 may include any combination of components and modules indicated in FIG. 2. In some embodiments, metrological interface device 170 may include additional components and modules to facilitate the system and method described herein.

Figure 3A:
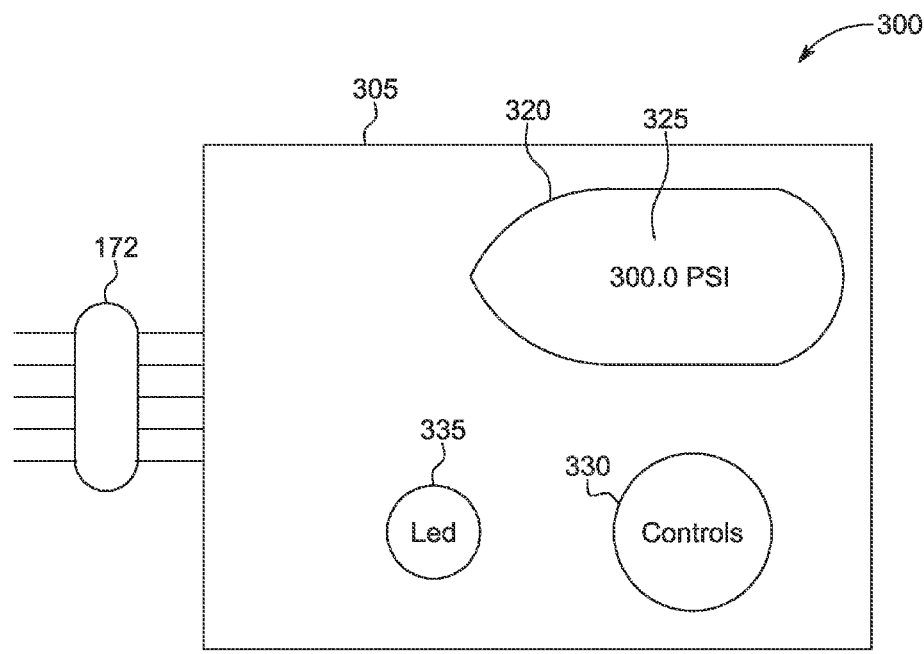
FIG. 3A is an illustration of an exemplary fob device containing metrological interface device shown in FIG. 2 used to create a universal wireless platform.

FIG. 3A is an illustration of an exemplary fob device 300 containing metrological interface device 170 (shown in FIG. 2) and used to create a universal wireless platform. Fob device 300 includes a housing 305 containing the PCB representing metrological interface device 170. Accordingly, metrological interface device 170 is not visible in FIG. 3A. Fob device 300 includes interface link 172 used to communicate with a metrological sensing device such as metrological sensing device 161 (shown in FIG. 1C). In the exemplary embodiment, fob device 300 is in communication with a pressure sensing device and receives asset data. Fob device 300 also includes a display 320 capable of displaying asset data 325. In the exemplary embodiment, display 320 is a liquid crystal display ("LCD"). In alternative embodiments, display 320 may include any display capable of representing asset data 325. Alternately, display 320 may display any information related to metrological interface device 170 and connected metrological sensing device 161 including, without limitation, power availability, signal strength, and connection status.

Fob device 300 also includes a control interface 330. In the exemplary embodiment, control interface 330 includes a plurality of buttons capable of controlling fob device 300. Control interface 330 can perform functions including, without limitation, power activation and deactivation, communication management, restart, and calibration of asset data 325. Fob device 300 further includes LED display 335 capable of providing information related to fob device 300 including, without limitation, communication link status and power status.

Figure 3B:
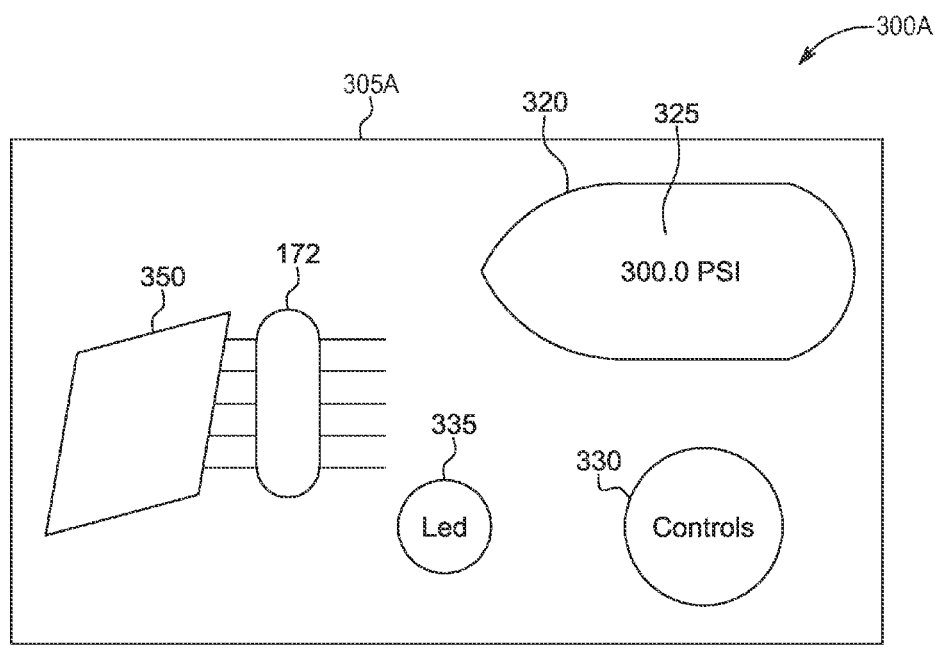
FIG. 3B is an illustration of an example hybrid device containing metrological interface device shown in FIG. 2 used to create a universal wireless platform.

FIG. 3B is an illustration of an example hybrid device 300A containing metrological interface device 170 (shown in FIG. 2) used to create a universal wireless platform. Hybrid device 300A includes metrological sensing device 350 in communication with metrological interface device 170 using interface link 172. In other words, hybrid device 300A includes a metrological sensing device 350 and metrological interface device 170 in a shared housing 305A. As in fob device 300, hybrid device 300A further includes display 320 configured to display asset data 325. Hybrid device 300A also includes controls 330 used to control hybrid device 300A. Hybrid device 300A additionally includes LED display 335 which is capable of providing information related to hybrid device 300A including, without limitation, communication link status and power status.

Accordingly, hybrid device 300A may provide value by assuring that a particular metrological sensing device 350 is always capable of communicating to a computing device such as mobile computing device 132 (shown in FIG. 1B) using a wireless protocol such as BLE. Because hybrid device 300A includes both metrological sensing device 350 and metrological interface device 170 and hybrid device 300A is configured so that they are in communication with one another, no additional configuration is required.

Figure 4:
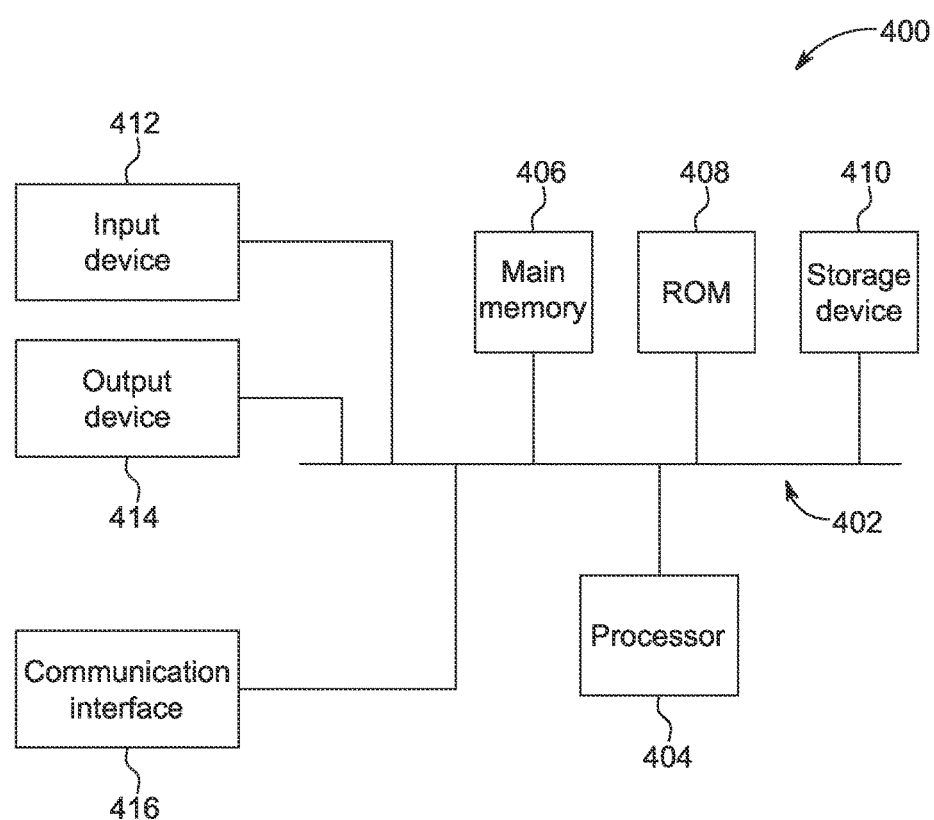
FIG. 4 is a block diagram of a computing device used in monitoring assets by interacting with the metrological interface device shown in FIG. 2 through the universal wireless platform.

FIG. 4 is a block diagram of a computing device 400 that may be used in monitoring physical assets 140 (shown in FIG. 1C) by interacting with metrological interface device 170 (shown in FIG. 2) using the universal wireless platform. Computing device 400 represents various forms of digital computers, such as laptops, desktops, workstations, personal digital assistants, servers, blade servers, mainframes, and other appropriate computers. Computing device 400 is also intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

In the exemplary embodiment, computing device 400 could be user mobile computing device 132 or any of monitoring server 180 and recording computing device 181 (shown in FIG. 1C). Computing device 400 may include a bus 402, a processor 404, a main memory 406, a read only memory (ROM) 408, a storage device 410, an input device 412, an output device 414, and a communication interface 416. Bus 402 may include a path that permits communication among the components of computing device 400.

Processor 404 may include any type of conventional processor, microprocessor, or processing logic that interprets and executes instructions. Processor 404 can process instructions for execution within the computing device 400, including instructions stored in the memory 406 or on the storage device 410 to display graphical information for a GUI on an external input/output device, such as display 414 coupled to a high speed interface. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system). In several examples embodiments, multiple computing devices 400 are used to receive, process, and communicate information related to field inspections of physical assets 140 (shown in FIG. 1C).

Main memory 406 may include a random access memory (RAM) or another type of dynamic storage device that stores information and instructions for execution by processor 404. ROM 408 may include a conventional ROM device or another type of static storage device that stores static information and instructions for use by processor 404. Main memory 406 stores information within the computing device 400. In one implementation, main memory 406 is a volatile memory unit or units. In another implementation, main memory 406 is a non-volatile memory unit or units. Main memory 406 may also be another form of computer-readable medium, such as a magnetic or optical disk.

Storage device 410 may include a magnetic and/or optical recording medium and its corresponding drive. The storage device 410 is capable of providing mass storage for the computing device 400. In one implementation, the storage device 410 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 406, ROM 408, the storage device 410, or memory on processor 404.

A high speed controller manages bandwidth-intensive operations for the computing device 400, while the low speed controller manages lower bandwidth-intensive operations. Such allocation of functions is for purposes of example only. In one implementation, the high-speed controller is coupled to main memory 406, display 414 (e.g., through a graphics processor or accelerator), and to high-speed expansion ports, which may accept various expansion cards (not shown). In the implementation, low-speed controller is coupled to storage device 410 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 412 may include a conventional mechanism that permits computing device 400 to receive commands, instructions, or other inputs from a user such as field inspector 111, 112, 113, and 114 (shown in FIG. 1B) including visual, audio, touch, button presses, stylus taps, etc. Additionally, input device may receive location information. Accordingly, input device 412 may include, for example, a camera, a microphone, one or more buttons, a touch screen, and/or a GPS receiver. Output device 414 may include a conventional mechanism that outputs information to the user, including a display (including a touch screen) and/or a speaker. Communication interface 416 may include any transceiver-like mechanism that enables computing device 400 to communicate with other devices and/or systems. For example, communication interface 416 may include mechanisms for communicating with another device or system via a network.

As described herein, computing device 400 facilitates the use of a universal wireless platform to obtain asset data from metrological sensing devices via metrological interface devices. Computing device 400 further facilitates dynamic workflow processing and thereby the collection, review, and processing of asset data. Computing device 400 may perform these and other operations in response to processor 404 executing software instructions contained in a computer-readable medium, such as memory 406. A computer-readable medium may be defined as a physical or logical memory device and/or carrier wave. The software instructions may be read into memory 406 from another computer-readable medium, such as data storage device 410, or from another device via communication interface 416. The software instructions contained in memory 406 may cause processor 404 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 400 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 400, and an entire system may be made up of multiple computing devices 400 communicating with each other.

The processor 404 can execute instructions within the computing device 400, including instructions stored in the main memory 406. The processor may be implemented as chips that include separate and multiple analog and digital processors. The processor may provide, for example, for coordination of the other components of the computing device 400, such as control of user interfaces, applications run by computing device 400, and wireless communication by computing device 400.

Computing device 400 includes a processor 404, main memory 406, ROM 408, an input device 412, an output device such as a display 414, a communication interface 416, among other components including, for example, a receiver and a transceiver. The computing device 400 may also be provided with a storage device 410, such as a microdrive or other device, to provide additional storage. Each of the components are interconnected using various buses, and several of the components may be mounted on a common motherboard or in other manners as appropriate.

Computing device 400 may communicate wirelessly through communication interface 416, which may include digital signal processing circuitry where necessary. In the exemplary embodiment, communication interface 416 provides for communication using Bluetooth® Low Energy ("BLE") or Bluetooth SMART®. Communication interface 416 may also provide for communications under various modes or protocols, such as 802.11b, ZigBee®, GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth®, WiFi, or other such transceiver (not shown). In addition, a GPS (Global Positioning system) receiver module may provide additional navigation- and location-related wireless data to computing device 400, which may be used as appropriate by applications running on computing device 400.

Figure 5:
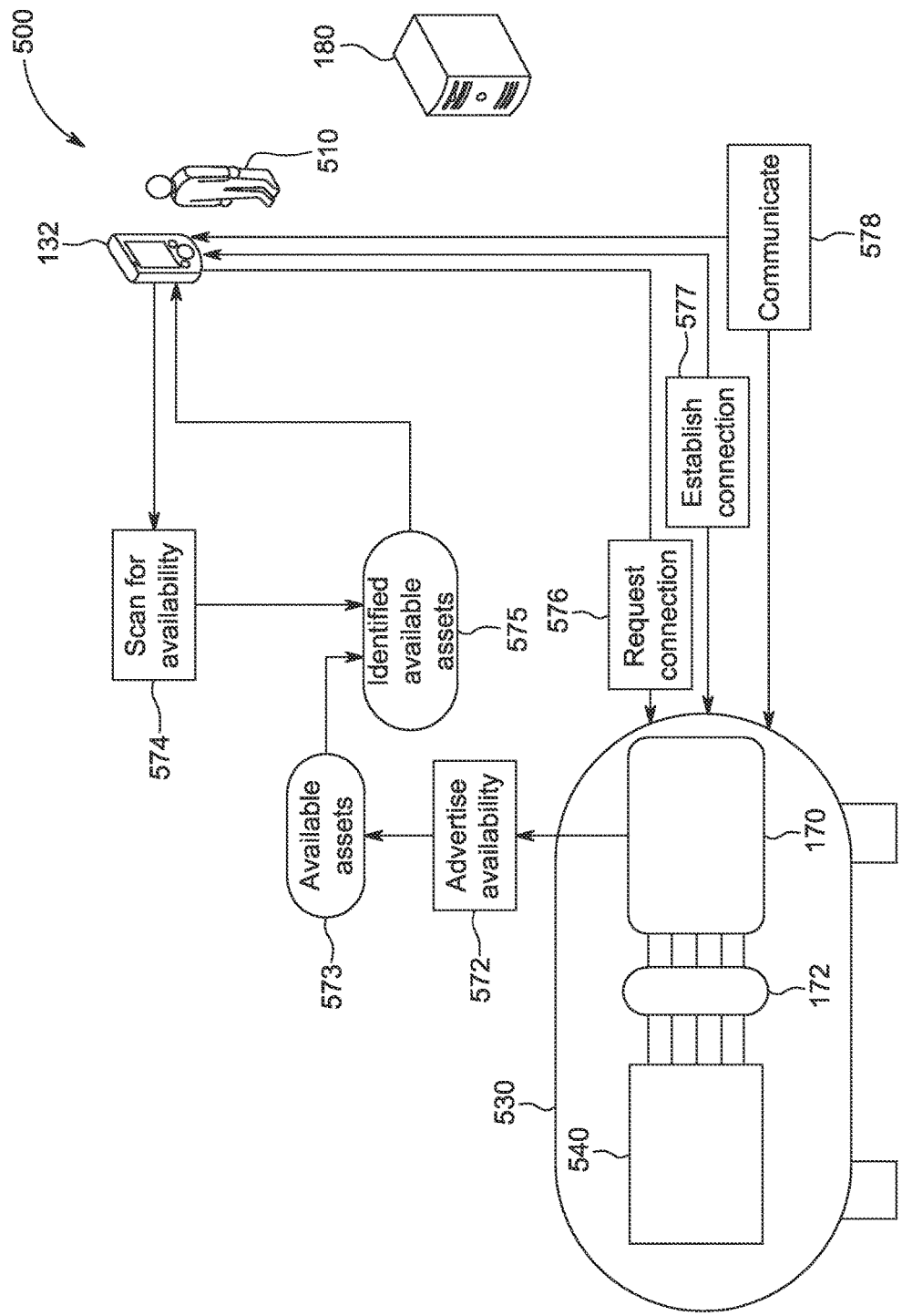
FIG. 5 is an exemplary process flow of a system implemented by the mobile computing device shown in FIG. 4 interacting with a metrological sensing device using the universal wireless platform and, more specifically, the metrological interface device shown in FIG. 2.

FIG. 5 is an exemplary process flow of a system implemented 500 by mobile computing device 132 interacting with a metrological sensing device 540 using the universal wireless platform and, more specifically, metrological interface device 170. FIG. 5 illustrates a simplified model of the use of the universal wireless platform in system 500 to explain the interaction between metrological sensing device 540, metrological interface device 170, and mobile computing device 132 using the platform. Although only one user 510, one mobile computing device 132, one physical asset 530, one metrological sensing device 540, one interface link 172, and one metrological interface device 170 are shown, the universal wireless platform can facilitate any number of each component. Note that, as described below, interactions may change when additional components are introduced.

In the exemplary embodiment, system 500 includes a user 510, such as field inspector 111 (shown in FIG. 1C), using mobile computing device 132 to conduct asset monitoring and inspection tasks. System 500 also includes physical asset 530 which is measured by metrological sensing device 540. In the exemplary embodiment, physical asset 530 is a pressure vessel and metrological sensing device 540 is a pressure meter. In other embodiments, physical asset 530 may be any kind of physical asset and metrological sensing device 540 may be any sensor or device capable of collecting asset data regarding physical asset 530 and interacting with metrological interface device 170 via interface link 172. System 500 also includes metrological interface device 170 communicating with metrological sensing device 540 via interface link 172. In the exemplary embodiment, metrological interface device 170 is fob device 300 (shown in FIG. 3A) communicating with metrological sensing device 540 using I2C protocol. In other embodiments, metrological interface device 170 may be contained in hybrid device 300A (shown in FIG. 3B) and communicate with metrological sensing device 540 using any communication protocol.

In operation, metrological interface device 170 advertises 572 availability for connection using a wireless protocol. In the exemplary embodiment, metrological interface device 170 uses BLE module 230 (shown in FIG. 2) to advertise 572 availability using Bluetooth® Low Energy. As used herein, "advertising" refers to a substantially persistent communication by a device, such as metrological interface device 170, indicating that the device is available for connection and communication. In some examples, metrological interface device 170 may advertise in a private mode. The private mode allows only computing devices 132 with pre-existing identifying information for metrological interface device 170 to detect the advertised 572 availability of the metrological interface device 170.

User 510 requests mobile computing device 132 to scan 574 for availability of metrological interface devices 170. Scan 574 detects all available assets 573 which have been advertised 572 by metrological interface devices 170. Accordingly, available assets 573 refer to metrological interface devices 170 which are advertising availability. Available assets 573 are reported back to mobile computing device 132 as identified available assets 575. In at least some examples, scan 574 detects available assets 573 only within a particular physical range of mobile computing device 132. In some additional examples, physical range may be determined by the strength of signal between mobile computing device 132 and metrological interface device 170. Accordingly, although a particular metrological interface device 170 may be advertising availability, mobile computing device 132 may not be able to identify 575 the availability because of physical distance, physical obstructions, and/or weak signal strength.

User 510 can view all identified available assets 575 on mobile computing device 132 and select a particular identified available asset 575 to connect with. Upon selection, mobile computing device 132 requests a connection 576 with metrological interface device 170. Requesting a connection 576 may require the use of encryption, security keys, and permissions. Such measures allow for greater security of data, including asset data, collected by metrological interface device 170. If such permissions, encryptions, and security keys are successfully used and satisfied, mobile computing device 132 and metrological interface device establish a connection 577. In the exemplary embodiment, the connection created on establishing a connection 577 is an "active" connection. In the exemplary embodiment, an active connection, as used herein, allows mobile computing device 132 to send and receive data, including asset data, to and from metrological interface device 170. Further, in the exemplary embodiment, the active connection is an exclusive connection which means that no other mobile computing device 132 may simultaneously access metrological interface device 170. Exclusivity allows for reduced redundant data being collected by users 510 and reduces the unnecessary use of metrological interface device 170. Reduction in unnecessary use of metrological interface device 170 substantially facilitates conserving power in metrological interface device 170. It should be noted that an exclusive active connection means that metrological interface device 170 can only connect to one mobile computing device 132. However, mobile computing device 132 can connect to a plurality of metrological interface devices 170. In other embodiments, metrological interface device 170 may have non-exclusive connections in an active connection.

In some examples, the connection formed by establishing a connection 577 may be a "dormant" connection. A dormant connection may retain the exclusivity of the active connection while no communication occurs between metrological interface device 170 and mobile computing device 132. A dormant connection may be established if one of mobile computing device 132 and/or metrological interface device 170 determine that a change has occurred in the connection state. A change in connection state may be indicated by the signal strength falling below a signal strength threshold, communication frequency between metrological interface device 170 and mobile computing device 132 falling below a communication interval threshold, an elapsed period between metrological interface device 170 and mobile computing device 132 exceeding a total connection time limit, and remaining batter life in metrological interface device 170 decreasing below a battery life threshold. Alternately, a change in connection state may cause the connection to be released. Releasing a connection causes an active connection to be terminated and resultantly prevents any communication between metrological interface device 170 and mobile computing device 132 without regenerating an active connection. Releasing a connection also causes metrological interface device 170 to begin advertising availability 572.

Upon establishing connection 577, mobile computing device 132 can additionally communicate 578 with metrological interface device 170. Communicating 578 represents sending and receiving data including asset data. In other words, upon establishing connection 577, mobile computing device 132 can receive asset data corresponding to the physical state of physical asset 530 as detected by metrological sensing device 540 and transmitted to metrological interface device 170 using interface link 172. Communication 578 also represents sending instructions to metrological interface device 170. For example, in the exemplary embodiment, user 510 viewing mobile computing device 132 may determine that asset data transmitted from metrological interface device 170 appears to be anomalous. User 510 may request mobile computing device 132 to transmit a calibration request to metrological interface device 170 causing a calibration process to be run on processor 220 (shown in FIG. 2).

Mobile computing device 132 includes software designed to facilitate system 500. Many known types of mobile computing devices 132 exist and are associated with many known types of operating systems, physical hardware, and associated configurations. The software designed to facilitate system 500 is designed with a flexible architecture which may be deployed on a plurality of types of mobile computing devices 132 and over a plurality of associated operating systems and hardware types. Accordingly, as metrological interface device 170 substantially allows for a universal wireless platform and enables a plurality of types of metrological sensing devices 540 to transmit data to computing devices including mobile computing devices 132, the software design associated with system 500 substantially allows for a plurality of types of mobile computing devices 132 to interact with the universal wireless platform. Additionally, the software facilitating system 500 similarly may support any computing devices 400 (shown in FIG. 4).

Figure 6:
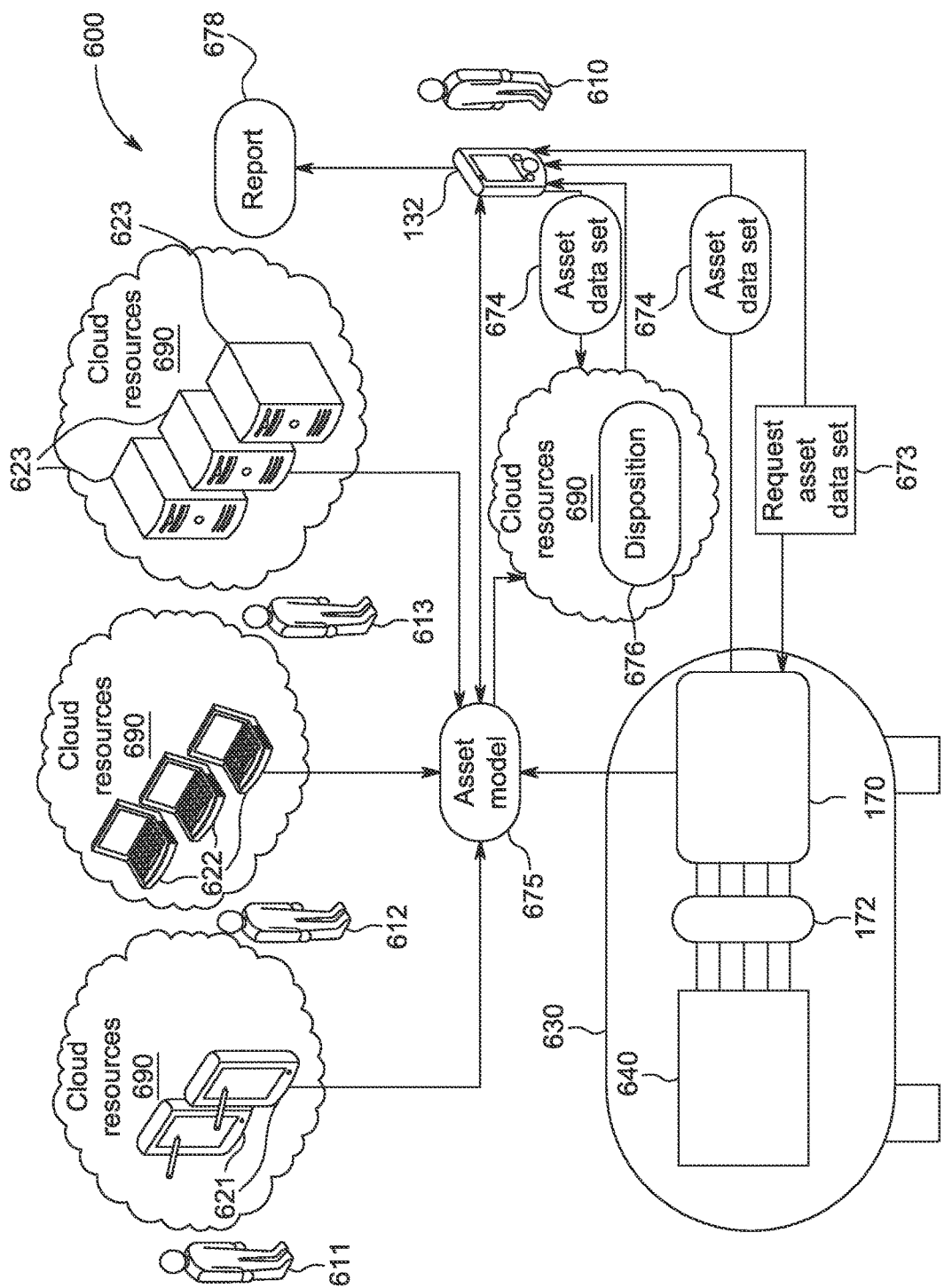
FIG. 6 is an exemplary process flow of a system implemented by the mobile computing device shown in FIG. 4 interacting with a metrological sensing device using the universal wireless platform and, more specifically, the metrological interface device shown in FIG. 2 to facilitate efficient asset data collection, asset monitoring, and asset inspection.

FIG. 6 is an exemplary process flow of a system 600 implemented by mobile computing device 132 interacting with a metrological sensing device 640 using the universal wireless platform and, more specifically, metrological interface device 170 to facilitate efficient asset data collection, asset monitoring, and asset inspection.

As in FIG. 5, FIG. 6 includes a user, field inspector 610, using a mobile computing device 132 to inspect and monitor physical asset 630. Physical asset 630 is monitored by metrological sensing device 640. In the exemplary embodiment, physical asset 630 is a pressure vessel 630 and metrological sensing device 640 is a pressure meter. In other embodiments, physical asset 630 may be any kind of physical asset and metrological sensing device 640 may be any sensor or device capable of collecting asset data regarding physical asset 630 and interacting with metrological interface device 170 via interface link 172.

System 600 also includes a plurality of computing devices in networked communication with mobile computing device 132. In the exemplary embodiment, computing including tablets 621, laptops 622, and servers 623. Computing devices 621, 622, and 623 function as cloud resources 690 and can resultantly function as secondary processing resources to mobile computing device 132. Cloud resources 690 including computing devices 621, 622, and 623 can also provide data to mobile computing device 132. Cloud resources 690 including computing devices 621, 622, and 623 are examples of generic computing device 400 (shown in FIG. 4). Computing devices 621, 622, and 623 are respectively associated with users 611, 612, and 613. Users 611, 612, and 613 may be used to facilitate processing and analysis described. Additionally, input received from a user such as users 611, 612, and 613 at computing devices 621, 622, and 623 may be used to facilitate processing and analysis. In other words, processing and analysis may substantially incorporate expert user data from users such as users 611, 612, and 613. Alternately, processing and analysis may apply algorithms including heuristic algorithms using computing devices 621, 622, and 623.

As in FIG. 5, the software designed to facilitate system 600 similarly is designed for a plurality of types of computing devices including mobile computing device 132. Accordingly, the software facilitates interaction with a plurality of operating systems and hardware architectures for a plurality of mobile computing devices 132. Additionally, the software facilitating system 600 similarly may support any computing devices 400 (shown in FIG. 4).

In operation, mobile computing device 132 has an established connection 577 (shown in FIG. 5) with metrological interface device 170 and is capable of communicating 578 (shown in FIG. 5). Mobile computing device 132 requests 673 a metrological data set, or asset data set 674. Asset data set 674 represents at least one asset data measured by metrological sensing device 640 and transmitted to metrological interface device 170 using interface link 172. Asset data set 674 is sent to mobile computing device 132 by metrological interface device 170 using a wireless protocol. Asset data set 674 may represent primary asset data (i.e., asset data representing physical characteristics of physical asset 630) or secondary asset data (i.e. asset data which may be processed into primary asset data). In the exemplary embodiment, physical asset 630 is a pressure vessel and metrological sensing device 640 is a pressure sensor. Accordingly, asset data set 674 describes a plurality of pressure readings associated with pressure vessel 630.

Cloud resources 690 (including computing device 621, 622, and 623) and/or mobile computing device 132 additionally store asset model 675 at a memory device, such as memory device 406 (shown in FIG. 4). Asset model 675 reflects a state of physical asset 630 based upon historically available asset data. In other words, asset model 675 represents a state of physical asset 630 without considering presently received asset data set 674. Asset model 675 describes the expected conditions and, therefore, the expected asset data associated with physical asset 630 based upon factors including the age, usage, and conditions of physical asset 630. Accordingly, inspection and monitoring of physical asset 630 involves a comparison between asset data set 674 and asset model 675. In the exemplary embodiment, asset model 675 describes a predicted condition of pressure vessel 630 and a predicted pressure reading expected to be received from metrological sensing device 640 in asset data set 674.

Asset data set 674 is processed with asset model 675 into a processed asset data set to determine a disposition 676. This processing step may additionally include processing asset data set 674 from secondary asset data into primary asset data using mobile computing device 132 and/or cloud resources 690. Further, depending on the availability of cloud resources 690 and the processing ability of mobile computing device 132, mobile computing device 132 either determines a disposition 676 locally (i.e., using mobile computing device 132) or requests that cloud resources 690 process disposition 676. Disposition 676 substantially represents determining whether asset data set 674 is predicted by asset model 675 or alternately determining whether asset data set 674 indicates a variance between asset model 675 and asset data set 674. In the exemplary embodiment, determining disposition 676 represents comparing the expected pressure reading of pressure vessel 630 based upon asset model 675 to the actual pressure reading received from metrological sensing device 640 in asset data set 674. If there is a variance, it may suggest that asset data set 674 is inaccurate or asset model 675 is inaccurate. Accordingly, additional readings may be useful to determine the presence of an anomaly. Alternately, if there is no variance, it may suggest that asset model 675 is accurate and field inspector 610 may not need to continue inspecting pressure vessel 630. In more complex examples, such rapid reconciliation between asset model 675 and asset data set 674 may make field inspections substantially more efficient. When a variance exists in disposition 676, field inspector 610 may take additional readings as asset data set 674 and efficiently update or replace asset model 675. Alternately, when no variance is determined to exist in disposition 676, field inspector 610 may reduce the expenditure of time and resources on field inspection by ceasing a field inspection at an earlier point than possible without the use of the system and method described.

If disposition 676 indicates that asset data set 674 is predicted by asset model 675, mobile computing device 132 generates report 678. Report 678 will be transmitted to at least one report recipient including, without limitation, mobile computing device 132, cloud resources 690, field inspector 610 and users 611, 612, 613. Report 678 may be transmitted using any suitable protocol including, without limitation, email, SMS, database update, file transfer, and physical transmission of a physical file.

If disposition 676 indicates that asset data set 674 is not predicted by asset model 675, mobile computing device may alternately recalibrate or update asset model 675 or request 673 asset data set 674 again. In the exemplary embodiment, when pressure readings from asset data set 674 are inconsistent with asset model 675, more readings may be required. In at least some examples, it may be important to confirm whether asset model 675 is actually inaccurate. For example, transient conditions or inconsistent metrological sensing devices 640 may cause asset data set 674 to produce a variance in disposition 676 for a brief period. Accordingly, some inspections may require multiple confirmations that asset data set 674 is in variance with asset model 675. Once a variance is sufficiently confirmed, asset model 675 may be updated. In other examples, however, asset model 675 may be immediately updated upon determining a variance. For example, if asset data set 674 is known to be simple and reliable (e.g., a physical measurement of width for a new metrological sensing device 640), it may be inefficient to take multiple readings and asset model 675 may be updated with no request for new asset data set 674.

Updating asset model 675 represents processing at least one asset data set 674 and asset model 675 to determine a new asset model. Given the computational complexity that may be required for updating at least some asset models 675, cloud resources 690 may be utilized for such updating.

During the workflow illustrated in FIG. 6, field inspector 610 may seek additional external input from human users including, for example, users 611, 612, and 613, and data sources associated with, for example, cloud resources 690. Accordingly, the software system provides tools which facilitate interaction between field inspector 610 and users 611, 612, and 613 including, without limitation, messaging and chat software. Similarly, the software system provides tools which facilitate querying cloud resources 690.

Figure 7:
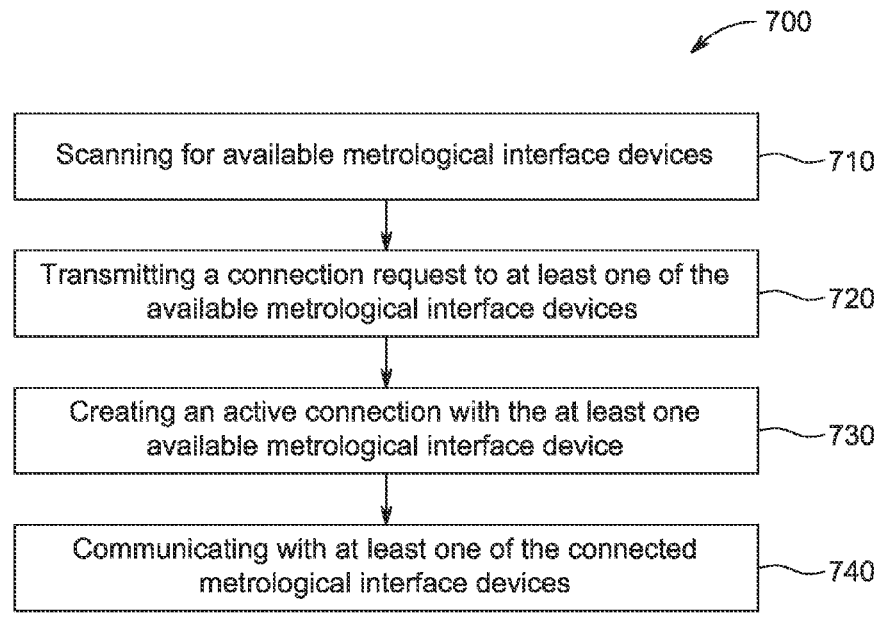
FIG. 7 is an exemplary method performed by the mobile computing device shown in FIG. 4 communicating with the metrological interface device shown in FIG. 2 using the universal wireless platform.

FIG. 7 is an exemplary method 700 performed by a mobile computing device 132 (shown in FIG. 5) communicating with a metrological interface device 170 (both shown in FIG. 5) using the universal wireless platform.

Mobile computing device 132 scans 710 for available metrological interface devices 170. Scanning 710 substantially represents mobile computing device 132 using wireless protocols including Bluetooth® Low Energy to identify metrological interface devices 170 that are advertising availability 572 as available assets 573 and are accordingly identified available assets 575 (shown in FIG. 5).

Mobile computing device 132 transmits 720 a connection request to at least one of the available metrological interface devices. Transmitting 720 substantially represents mobile computing device 132 requesting a connection 576 (shown in FIG. 5) to at least one metrological interface device 170.

Mobile computing device 132 creates 730 an active connection with the at least one available metrological interface device. Creating 730 an active connection represents mobile computing device requesting 576 (shown in FIG. 5) a connection with one of the identified available assets 575 and establishing 577 a connection.

Mobile computing device 132 communicates 740 with at least one connecting metrological interface device. Communicating 740 represents mobile computing device 132 communicating with metrological interface device 170 after establishing connection 577.

Figure 8:
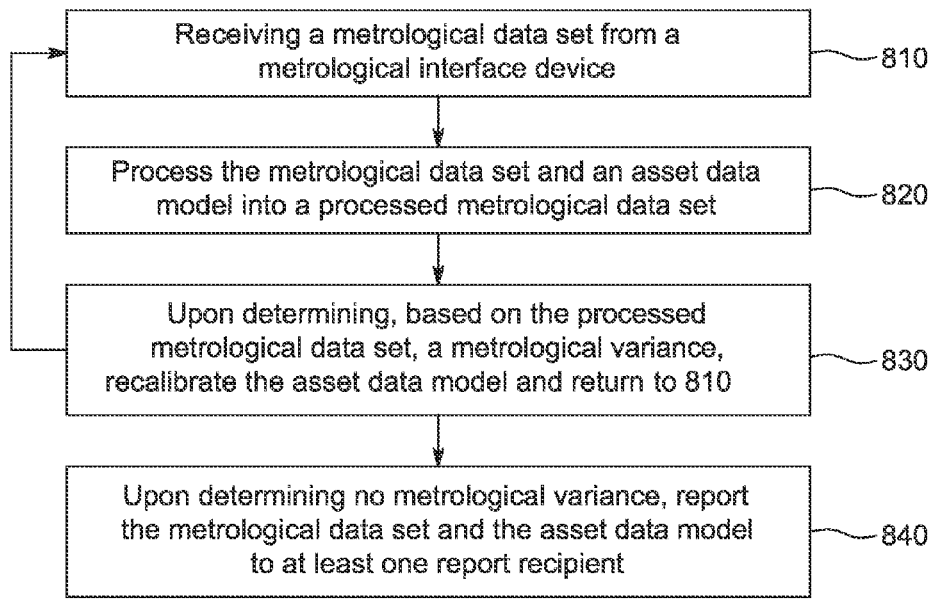
FIG. 8 is an exemplary method performed by the mobile computing device shown in FIG. 4 communicating with the metrological interface device shown in FIG. 2 and a plurality of cloud based resources using the universal wireless platform.

FIG. 8 is an exemplary method 800 performed by a mobile computing device 132 communicating with a metrological interface device 170 and a plurality of cloud based resources 690 (all shown in FIG. 6) using the universal wireless platform.

Mobile computing device 132 initially receives 810 a metrological data set from a metrological interface device. Receiving 810 represents mobile computing device 132 receiving asset data set 674 after requesting 673 asset data set 674 (both shown in FIG. 6). Asset data set 674 includes asset data detected by metrological sensing device 640 (shown in FIG. 6) and transmitted to metrological interface device 170.

Mobile computing device 132 processes the metrological data set and an asset model into a processed metrological data set. Processing 820 represents mobile computing device 132 requesting asset model 675 (shown in FIG. 6) from at least one of memory device 406 (shown in FIG. 4) associated with mobile computing device and memory devices 406 associated with cloud based resources 690 and comparing the predicted asset data set to asset data set 674. In at least some embodiments, mobile computing device 132 uses cloud based resources 690 to process 820 asset data set 674 and asset model 675.

Processing 820 may result in the determination of an inconsistency, or metrological variance, in processed metrological data set. Upon determining such metrological variance, mobile computing device 132 recalibrates 830 the asset model and receives 810 a metrological data set from a metrological interface device. In other words, when a metrological variance is determined, asset model 675 may be adjusted and a new asset data set 674 is requested and received to confirm the recalibrated asset model 675.

Upon determining no metrological variance, computing device 132 reports 840 the metrological data set and the asset model to at least one report recipient. Reporting 840 represents transmitting report 678 (shown in FIG. 6) to at least one report recipient including, without limitation mobile computing device 132, cloud resources 690, field inspector 610 and users 611, 612, 613 (all shown in FIG. 6).

Figure 9:
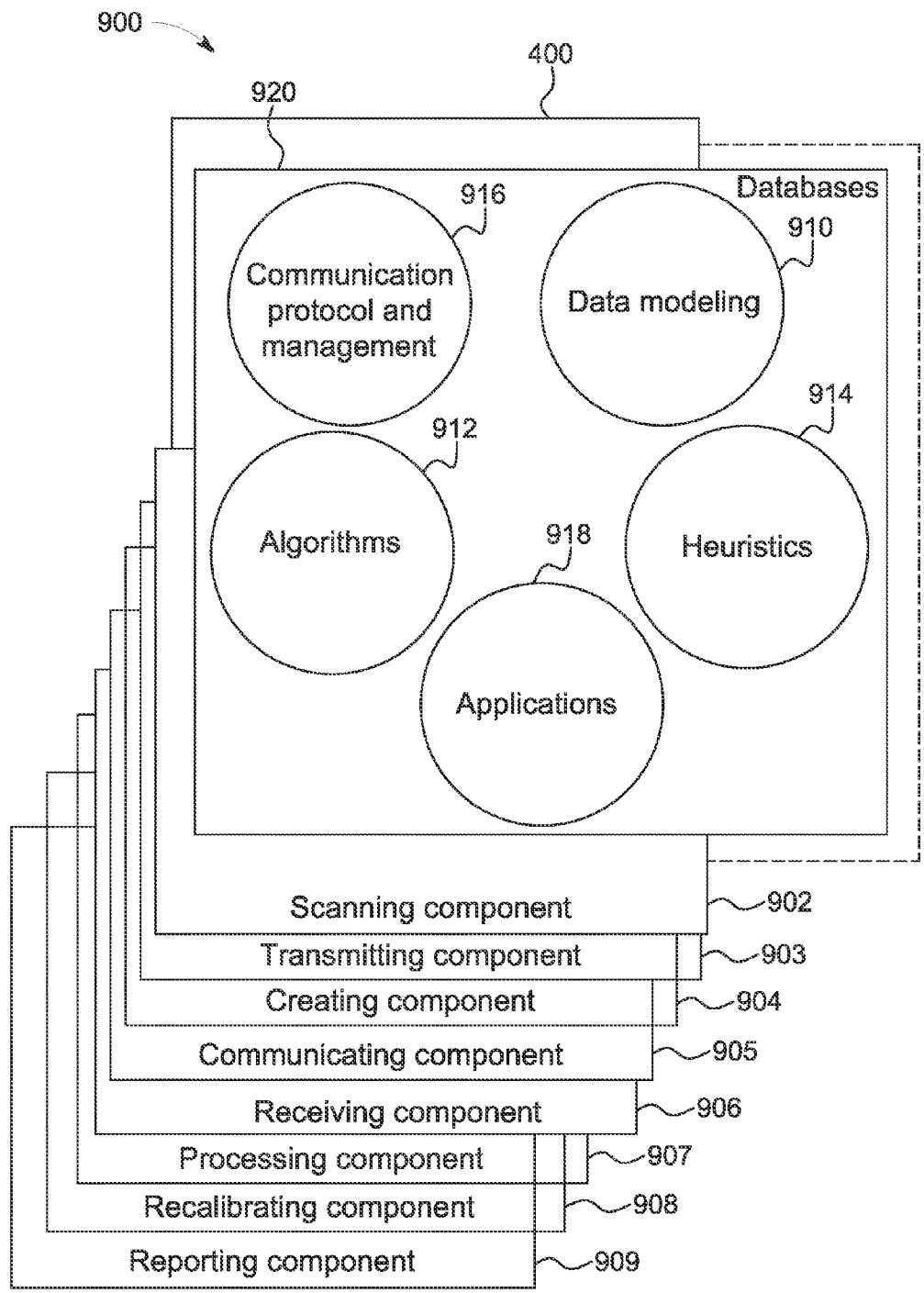
FIG. 9 is a diagram of components of one or more example computing devices that may be used in the environment shown in FIGS. 5 and 6.

FIG. 9 is a diagram of components of one or more example computing devices that may be used in the environment shown in FIGS. 5 and 6.

For example, one or more of computing devices 400 may be used to process transmit and process asset data sets 674 and asset models 675 (shown in FIG. 6). Computing devices 400 may include mobile computing devices 132 (shown in FIGS. 5 and 6) and cloud resources 690 (shown in FIG. 6). FIG. 9 further shows a configuration of database 920 which may be in communication with any computing device 400. Database 920 is coupled to several separate components within computing device 400 and includes information which perform specific tasks.

Computing device 400 includes a scanning component 902 for scanning 710 (shown in FIG. 7) for available metrological interface devices 170 (shown in FIG. 2). Computing device 400 further includes a transmitting component 903 for transmitting 720 (shown in FIG. 7) a connection request to at least one of the available metrological interface devices. Computing device 400 also includes creating component 904 for creating 730 (shown in FIG. 7) an active connection with the at least one available metrological interface device. Computing device 400 additionally includes communicating component 905 for communicating 740 (shown in FIG. 7) with at least one connecting metrological interface device. Computing device 400 further includes receiving component 906 for receiving 810 (shown in FIG. 8) a metrological data set from a metrological interface device. Computing device 400 also includes processing component 907 for processing 820 (shown in FIG. 8) the metrological data set and an asset model into a processed metrological data set. Computing device 400 additionally includes recalibrating component 908 for recalibrating 830 (shown in FIG. 8) the asset model. Computing device 400 moreover includes reporting component 909 for reporting 840 (shown in FIG. 8) report 678 (shown in FIG. 6) to at least one report recipient including, without limitation mobile computing device 132, cloud resources 690, field inspector 610 and users 611, 612, 613 (all shown in FIG. 6).

In an exemplary embodiment, database 920 is divided into a plurality of sections, including but not limited to, a data modeling section 910, an algorithms section 912, a heuristics section 914, a communications protocol and management section 916, and an applications section 918. These sections within database 120 are interconnected to update and retrieve the information as required. Data modeling section 910 may include data models. Algorithms section 912 may include algorithms for processing and analyzing asset data. Heuristics 914 may include programs and functions to solve questions related to asset data. Communication and protocol management section 916 may include information and policies regarding the communication over the universal wireless platform. Applications section 918 may include information related to the applications and distributions and versions of applications to facilitate the systems and methods described.

The above-described computer-implemented systems and methods provide an efficient approach for inspecting and monitoring physical assets using a universal wireless platform. The systems and methods create such efficiency by providing a metrological interface device capable of receiving data from a plurality of metrological sensing devices and transmitting data to a plurality of computing devices. The embodiments described herein also reduce communication and logistics costs associated with poorly timed or coordinated decisions. Specifically, by collecting data described above efficiently, limited effort is spent on data collection and physical interaction with metrological sensing devices is minimized. Therefore, the issues which may arise without such an approach are minimized. Also, the methods and systems described herein increase the utilization of resources in monitoring and inspection tasks. Specifically, by taking such a coordinated, cloud-based approach, resources utilization is enhanced. Further, the methods and systems described herein improve capital and human resource expenditure through enhanced coordinated activities.

An exemplary technical effect of the methods and computer-implemented systems described herein includes at least one of (a) increased field inspection of physical assets; (b) increased speed of analysis of asset data; and (c) improved response times for diagnostics and maintenance of physical assets.

Exemplary embodiments for facilitating a universal wireless platform for use in inspection and monitoring is described above in detail. The computer-implemented systems and methods of operating such systems are not limited to the specific embodiments described herein, but rather, components of systems and/or steps of the methods may be utilized independently and separately from other components and/or steps described herein. For example, the methods may also be used in combination with other enterprise systems and methods, and are not limited to practice with only the inspection and monitoring functions as described herein. Rather, the exemplary embodiment can be implemented and utilized in connection with many other enterprise applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented system comprising:
   a universal wireless platform comprising cloud resources;
   a plurality of metrological interface devices, each said metrological interface device comprising a printed circuit board (PCB) comprising at least one metrological sensor communication interface, and at least one first standard wireless communication interface, wherein each said metrological interface device is in communication with a metrological sensing device via said metrological sensor communication interface, wherein each metrological sensing device is configured to detect metrological data from a physical asset, each said metrological interface device is configured to receive the metrological data from the metrological sensing device; and
   a portable computing device, said portable computing device comprising a memory device, a processor coupled to said memory device, and further comprising a second standard wireless communication interface coupled to said memory device and to said processor, wherein said second standard wireless communication interface is configured to communicate with said plurality of metrological interface devices via said first standard wireless communication interface via the universal wireless platform, said portable computing device configured to exclusively connect to one of the plurality of metrological interface devices and:
   a) receive a metrological data set that substantially represents data associated with the physical asset at a point in time;
   b) process, by said processor, the metrological data set and an asset data model into a processed metrological data set that substantially represents a model of the physical asset associated with the metrological sensing device and further associated with said metrological interface device, wherein the asset data model is based on historically available asset data and describes a predicted condition of the physical asset;
   c) upon determining, based on the processed metrological data set, a metrological variance, recalibrate the asset data model and return to step (a); and
   d) upon determining no metrological variance, report the metrological data set and the asset data model to at least one report recipient.

2. The computer-implemented system in accordance with claim 1, wherein said metrological interface device is configured to:
   retrieve the asset data model from at least one of said portable computing device, a second portable computing device, a server computing device, and a networked storage device.

3. The computer-implemented system in accordance with claim 1, wherein said metrological interface device is further configured to recalibrate the asset data model and further configured to:
   request model input from at least one asset data model evaluator;
   receive model input from the at least one asset data model evaluator; and
   update the asset data model using the model input.

4. The computer-implemented system in accordance with claim 1, wherein said metrological interface device is further configured to recalibrate the asset data model and further configured to:
   determine that the processed metrological data indicates that the physical asset has changed in asset disposition;
   determine, based on the processed metrological data, a present disposition associated with the physical asset;

determine, based on the present disposition, a model correction; and calibrate the asset data model using the model correction.

5. The computer-implemented system in accordance with claim 1, wherein said metrological interface device is configured to:

determine, based upon the asset data model and the metrological data set, a plurality of outcome probabilities associated with a plurality of outcome scenarios, the plurality of outcome scenarios associated with the physical asset.

6. The computer-implemented system in accordance with claim 1 wherein said metrological interface device is configured to:

determine, based upon the asset data model and the metrological data set, at least one recommended next step associated with the physical asset, the at least one recommended next step representing a proposed course of action related to the service of the physical asset; and report the at least one recommended next step to the at least one report recipient.

7. The computer-implemented system in accordance with claim 1 wherein each said portable computing device is configured to:

process the metrological data set and the asset data model into the processed metrological data set using at least one networked computing resource associated with said portable computing device.

8. The computer-implemented system in accordance with claim 1 wherein each said portable computing device is configured to:

process the metrological data set from a secondary metrological data set into a primary metrological data set, wherein the secondary metrological data set represents a second set of data associated with the physical asset which does not represent a physical state of the physical asset and the primary metrological data set represents a first set of data associated with the physical asset which represents the physical state of the physical asset.

9. The computer-implemented system in accordance with claim 1, wherein each said portable device is configured to process the metrological data by applying at least one of heuristic algorithms and expert-user input.

10. The computer-implemented system in accordance with claim 1, wherein each of the plurality of metrological interface devices comprises a processor configured process the metrological data received from the metrological sensing device into at least one physical measurement of the physical asset.

11. A computer-based method performed by a portable computing device, the portable computing device including a memory device, a processor coupled to the memory device, and further including a second standard wireless communication interface coupled to the memory device and to the processor, wherein the second wireless communication interface is configured to communicate via a universal wireless platform comprising cloud resources with a plurality of metrological interface devices each having at least one metrological sensor communication interface and at least one first standard wireless communication interface, the plurality of metrological interface devices in communication with a plurality of metrological sensing devices, the metrological sensing devices configured to detect metrological data from a physical asset, the method comprising:

a) exclusively connecting the portable computing device to one of the plurality of metrological interface devices;

b) receiving a metrological data set, the metrological data set substantially representing data associated with the physical asset at a point in time;

c) processing the metrological data set and an asset data model into a processed metrological data set, the asset data model substantially representing a model of the physical asset associated with the metrological sensing device and further associated with the metrological interface device, wherein the asset data model is based on historically available asset data and describes a predicted condition of the physical asset;

d) upon determining, based on the processed metrological data set, a metrological variance, recalibrating the asset data model and returning to step (b); and e) upon determining no metrological variance, reporting the metrological data set and the asset data model to at least one report recipient.

12. The computer-based method in accordance with claim 11, further comprising:

retrieving the asset data model from at least one of the portable computing device, a second portable computing device, a server computing device, and a networked storage device.

13. The computer-based method in accordance with claim 11, further comprising:

requesting model input from at least one asset data model evaluator;

receiving model input from the at least one asset data model evaluator; and updating the asset data model using the model input.

14. The computer-based method in accordance with claim 11, further comprising:

determining that the processed metrological data indicates that the physical asset has changed in asset disposition;

determining, based on the processed metrological data, a present disposition associated with the physical asset;

determining, based on the present disposition, a model correction; and calibrating the asset data model using the model correction.

15. The computer-based method in accordance with claim 11, further comprising determining, based upon the asset data model and the metrological data set, a plurality of outcome probabilities associated with a plurality of outcome scenarios, the plurality of outcome scenarios associated with the physical asset.

16. The computer-based method in accordance with claim 11, further comprising:

determining, based upon the asset data model and the metrological data set, at least one recommended next step associated with the physical asset, the at least one recommended next step representing a proposed course of action related to the service of the physical asset; and reporting the at least one recommended next step to the at least one report recipient.

17. The computer-based method in accordance with claim 11, further comprising:

processing the metrological data set and the asset data model into the processed metrological data set using at least one networked computing resource associated with the portable computing device.

18. The computer-based method in accordance with claim 11, further comprising:

processing the metrological data set from a secondary metrological data set into a primary metrological data set, wherein the secondary metrological data set represents a second set of data associated with the physical asset which does not represent a physical state of the physical asset and the primary metrological data set represents a first set of data associated with the physical asset which represents the physical state of the physical asset.

19. The computer-based method in accordance with claim 11, further comprising processing the metrological data by applying at least one of heuristic algorithms and expert-user input.

* * * * *